(12) United States Patent  
Salgado

(10) Patent No.: US 8,614,653 B1  
(45) Date of Patent: Dec. 24, 2013

(54) ELECTRONIC DISPLAY DEVICE FOR SPECIAL EVENTS

(76) Inventor: Leah Salgado, Los Angeles, CA (US)

( * ) Notice: Subject to any disclaimer, the term of this patent is extended or adjusted under 35 U.S.C. 154(b) by 903 days.

(21) Appl. No.: 12/166,432

(22) Filed: Jul. 2, 2008

Related U.S. Application Data

(60) Provisional application No. 60/977,455, filed on Oct. 4, 2007.

(51) Int. Cl.  
*G09G 3/20* (2006.01)

(52) U.S. Cl.  
USPC .............................. 345/56; 345/168; 345/82

(58) Field of Classification Search  
USPC ............................ 715/730–732; 40/361–367  
See application file for complete search history.

(56) References Cited

U.S. PATENT DOCUMENTS

| | | | | |
|---|---|---|---|---|
| 2,602,253 A | * | 7/1952 | Diamond | 40/367 |
| 5,546,565 A | * | 8/1996 | Suzuki | 382/187 |
| 5,908,142 A | * | 6/1999 | Sacchetti | 222/25 |
| 6,211,475 B1 | * | 4/2001 | Ozaki | 200/43.01 |
| 2007/0268271 A1 | * | 11/2007 | Kinjo | 345/173 |

FOREIGN PATENT DOCUMENTS

| | | | |
|---|---|---|---|
| JP | 2005-266968 | * | 9/2005 |
| KR | 1020060023593 | * | 1/2007 |

* cited by examiner

*Primary Examiner* — Kenneth Bukowski  
(74) *Attorney, Agent, or Firm* — Kenneth L Tolar

(57) ABSTRACT

An electronic display device for special events includes a base structure with a riser extending therefrom. At an upper, distal end of the riser are a pair of transparent document display panels that are oriented and configured to resemble an open book. The display panels each include an open side edge for receiving photographs, documents and other tangible items related to the special event. On a front surface of the base structure is an LED screen for continuously displaying a scrolling, prerecorded text message. A user enters the desired text message using a keypad on a side of the base structure.

9 Claims, 2 Drawing Sheets

ELECTRONIC DISPLAY DEVICE FOR SPECIAL EVENTS

CROSS REFERENCE TO RELATED APPLICATIONS

This application is entitled to the benefit of provisional application No. 60/977,455 filed on Oct. 4, 2007, the specification of which is incorporated herein by reference.

BACKGROUND OF THE INVENTION

The present invention relates to an electronic display device for special events.

DESCRIPTION OF THE PRIOR ART

During the celebration of special events such as weddings, birthdays, retirements or religious ceremonies, a guest registration book is customarily placed at an entrance for recording the identity of attendees. In the same general area, the event sponsor may wish to display memorabilia related to the event such as photographs, announcements or invitations. The presentation of the items in such fashion is passive and often requires intervention from others. Furthermore, the items are often lying on a table or similar support surface where they are not readily visible.

Accordingly, there is currently a need for a device that will more efficiently and conveniently display various items associated with a special event. A review of the prior art reveals numerous photograph and memorabilia display devices. For example, U.S. published patent application no. 2003/0127845 filed on behalf of Mattos discloses a photograph book.

U.S. Pat. No. 6,427,370 issued to Smith discloses a picture frame with a sound and motion producing means.

U.S. Pat. No. 6,381,573 issued to Loudermilk discloses a picture frame that can emit an audio message associated with a discrete picture by touching the picture or frame.

U.S. Pat. Nos. 4,531,638 3,741,565 issued to Breitling et al. discloses a talking photograph album.

U.S. Pat. No. 6,805,459 issued to Jacobozzi et al. discloses a mounting means for remembrance items.

U.S. patent no. issued to Prescott et al. discloses a self-illuminating book.

As indicated above, numerous photograph-display devices having programmable audio players exist in the prior art. However, none of the above referenced devices are specifically designed to conveniently display memorabilia associated with certain special events. The present invention includes features that are not disclosed by any of the references cited above, inter alia, a document support assembly including a pair of arcuate, transparent panels configured to resemble an open book that are positioned at an angle relative to a vertical plane so as to be more visible to those nearby. Each panel includes an open side edge for receiving photographs, invitations or other tangible media that a user wishes to display.

SUMMARY OF THE INVENTION

An electronic display device for special events includes a base structure with a riser extending therefrom. At an upper, distal end of the riser are a pair of transparent document display panels that are oriented and configured to resemble an open book. The display panels each include an open side edge for receiving photographs, documents and other tangible items related to the special event. On a front surface of the base structure is an LCD display screen for continuously displaying a scrolling, prerecorded text message. A user enters the desired text message using a keypad on a side of the base structure.

It is therefore an object of the present invention to provide a means for more conveniently displaying messages and memorabilia associated with a special event.

It is another object of the present invention to provide an electronic display device that overcomes the disadvantages of conventional display practices typically employed during certain special events.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
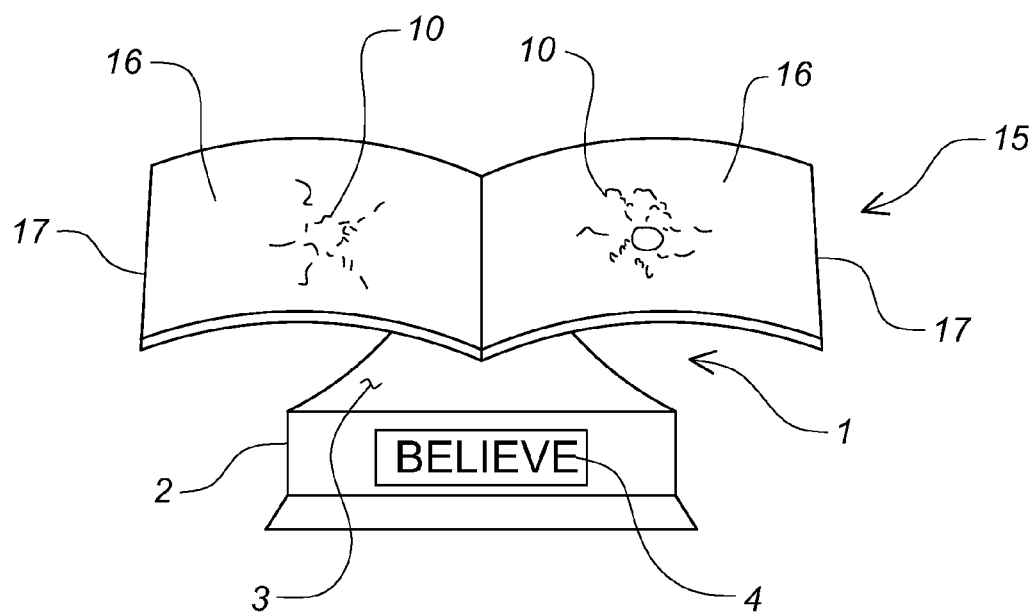
FIG. 1 is a front, perspective view of the device.
Figure 2:
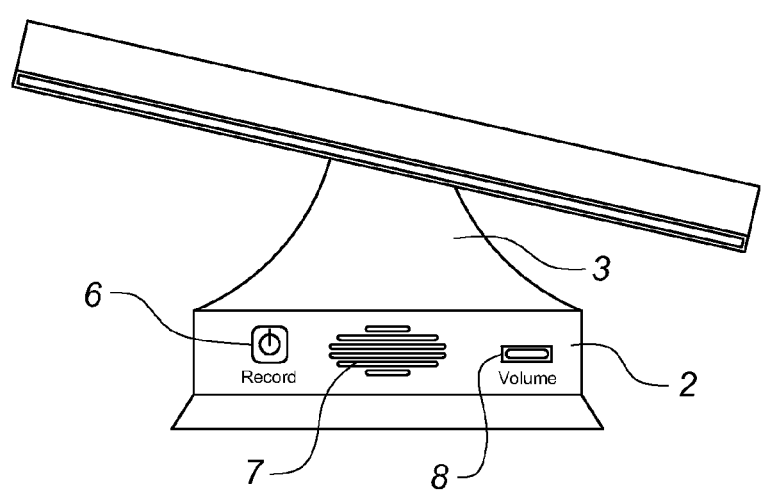
FIG. 2 is a side view of the device.
Figure 3:
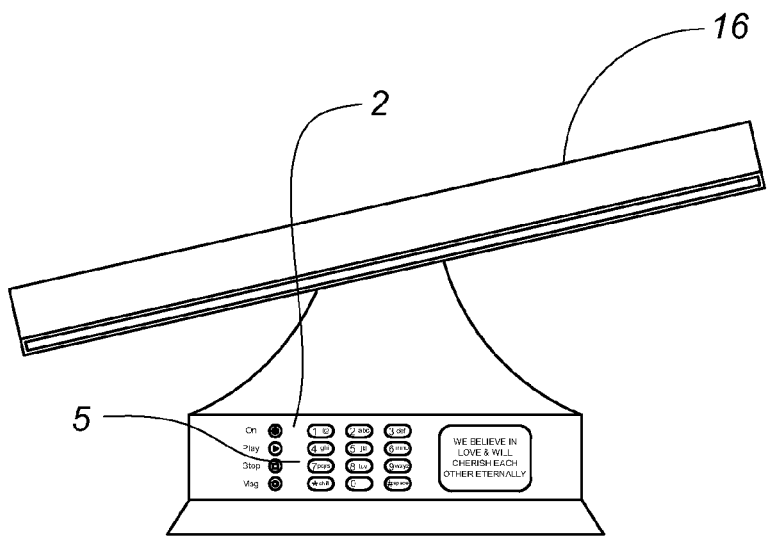
FIG. 3 is a view of the device from a side opposite that of FIG. 2.
Figure 4:
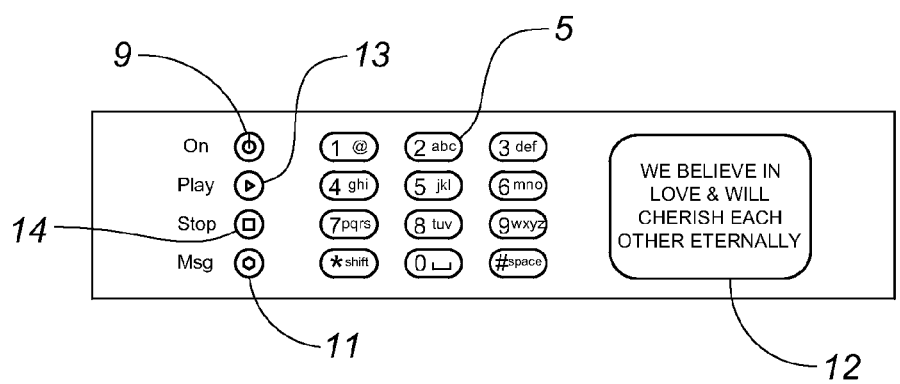
FIG. 4 is a closeup, detailed view of the various message control buttons and adjacent alphanumeric keypad.

The present invention relates to an electronic device for displaying certain memorabilia associated with a special event. The device comprises a base structure 1 including a lower portion 2 with a riser 3 extending therefrom. A scrolling LED display 4 is positioned on a front surface of the lower portion. On a side of the lower portion are a plurality of function buttons 9,11,13,14 with a phone-style alphanumeric keypad 5 adjacent thereto that allow a user to input desired text messages. The device also includes an internal voice chip on which a desired voice message may be recorded by depressing a record button 6 on an opposing side of the base structure. The voice chip output is emitted through a speaker 7 adjacent to the record button; the output volume is adjusted with a volume control dial 8.

A power button 9 provides electricity to all of the electronics associated with the device, including a document support back light 10, described, infra. A second button 11, when depressed once, allows a user to enter a predetermined text message using the alphanumeric keypad; the entered message is stored within a memory device such as a microprocessor. Once the message has been completely entered, the button is depressed again, thereby terminating any input. While the message is being entered, it is depicted on a smaller review screen 12 adjacent to the keypad for immediate review. When a third button 13 is depressed, the entered message is continuously scrolled across the larger LED display on the front surface of the base structure. Simultaneously, any prerecorded message is automatically emitted via the speaker. A fourth button 14, when depressed, terminates scrolling of the entered text message, disables the voice chip output and deactivates the back light.

At an upper distal end of the riser is a document support assembly 15 including a pair of arcuate, transparent panels 16 configured to resemble an open book. As such, the panels are positioned at an angle relative to a vertical plane so as to be more visible to those nearby. Each panel includes an open side edge 17 for receiving photographs, invitations or other tangible media that a user wishes to display. Pressing the power button will activate the back light, which illuminates the transparent panels and, thus, any tangible items positioned therein.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An electronic device for displaying memorabilia associated with a special event comprising:
    a base structure including a lower portion with a riser extending therefrom; a document-support assembly at an upper distal end of the riser, said support assembly including a pair of arcuate, transparent panels configured to resemble an open book, said panels positioned at an angle relative to a vertical plane so as to be more visible to persons nearby, each of said panels having an open side edge in communication with a space behind each of said panels for receiving tangible media to interchangeably display desired media within said panels, each of said transparent panels further including a designated back light for illuminating any tangible items received within said panels;
    a customizable, message-display means for displaying a desired message associated with the special event, wherein said customizable, message-display means comprises a scrolling LED display positioned on said base structure, a programmable memory device in communication with said scrolling LED display, a plurality of function buttons and an alphanumeric keypad positioned on said base structure, said buttons and said keypad in communication with said memory device whereby a user inputs a desired message using said alphanumeric keypad so that said desired message is stored within said memory device and depicted on said scrolling LED display;
    a means for continuously scrolling said desired message on said display;
    a voice recording means for recording and emitting a desired audio message associated with the special event;
    a means for exclusively disabling said means for continuously scrolling said desired message, said means for emitting said desired audio message and said back light.

2. The electronic device according to claim 1 further comprising a message review means for allowing a user to preview the desired message as said message is being entered into said alphanumeric keypad.

3. The electronic device according to claim 2 wherein said message review means comprises a review screen adjacent said keyboard and in communication therewith that depicts characters associated with a key as said key is depressed.

4. The electronic device according to claim 1 further comprising means for exclusively disabling any further input with said alphanumeric keypad once a desired message has been entered.

5. The electronic device according to claim 1 wherein the lower portion of said base structure includes a front surface and at least one side, said scrolling display positioned on the front surface of said lower portion, and said keypad, said function buttons and said review screen positioned on the side of said lower portion.

6. An electronic device for displaying memorabilia associated with a special event comprising:
    a base structure including a lower portion with a riser extending therefrom, said lower portion including a front surface and at least one side;
    a document-support assembly at an upper distal end of the riser, said support assembly including a pair of arcuate, transparent panels configured to resemble an open book, said panels positioned at an angle relative to a vertical plane so as to be more visible to persons nearby, each of said panels having an open side edge in communication with a space behind each of said panels for receiving tangible media to interchangeably display desired media within said panels;
    a customizable, message-display means for displaying a desired message associated with the special event, wherein said customizable message display means comprises a scrolling display positioned on the front surface of the lower portion of said base structure, a programmable memory device in communication with said scrolling display, a plurality of function buttons and an alphanumeric keypad positioned on the side of the lower portion of said base structure, said buttons and said keypad in communication with said memory device whereby a user inputs a desired message using said alphanumeric keypad so that said desired message is stored within said memory device and depicted on said scrolling display;
    a message review means for allowing a user to preview the desired message as said message is being entered into said alphanumeric keypad, wherein said message review means comprises a review screen adjacent said keyboard and in communication therewith that depicts characters associated with a key as said key is depressed.

7. The electronic device according to claim 6 further comprising a voice recording means for recording and emitting a desired audio message associated with the special event.

8. The electronic device according to claim 6 wherein each of said transparent panels includes a designated back light for illuminating any tangible items received within said panels.

9. The electronic device according to claim 6 further comprising means for exclusively disabling any further input with said alphanumeric keypad once a desired message has been entered.

* * * * *